United States Patent Office 3,345,261
Patented Oct. 3, 1967

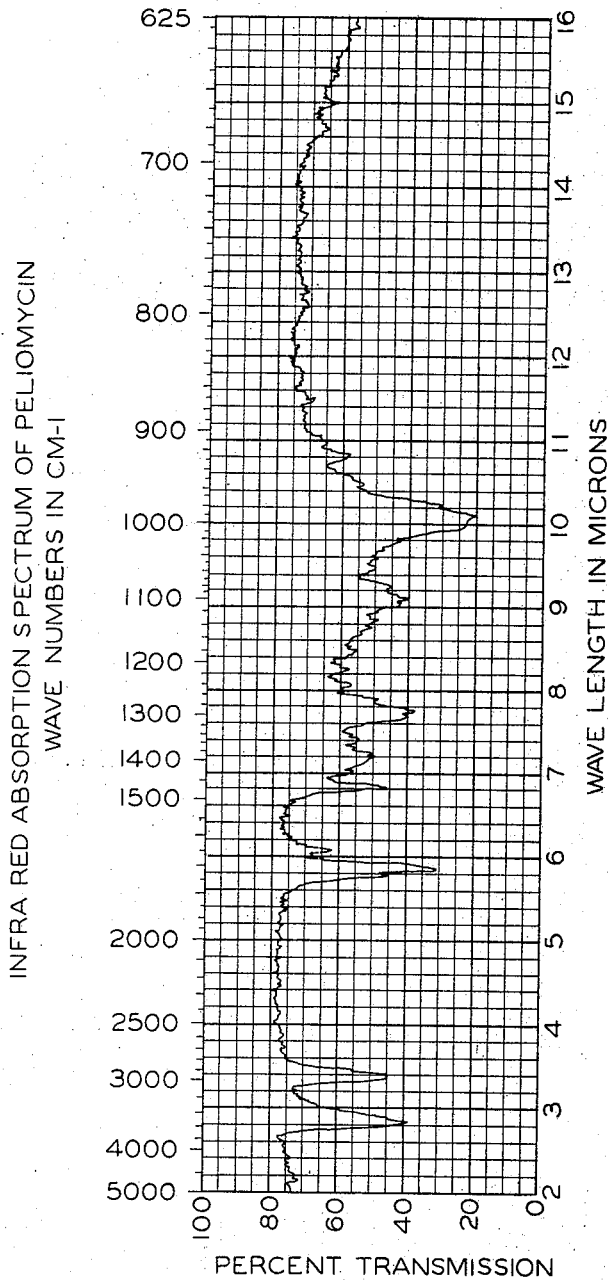
KENNETH E. PRICE
HENRY SCHMITZ INVENTORS.
BY BRUCE B. CLYMAN
CURTIS W. CARLSON
RICHARD H. BRINK AND
HERBERT W. TAYLOR, JR.
ATTORNEYS.

3,345,261
PELIOMYCIN AND METHOD OF
PREPARING SAME
Kenneth E. Price, Fayetteville, and Henry Schmitz, Syracuse, N.Y., assignors to Bristol-Myers Company, New York, N.Y., a corporation of Delaware
Filed Sept. 25, 1963, Ser. No. 311,409
5 Claims. (Cl. 167—65)

This invention relates to a new and useful substance called peliomycin and to processes for its production. More particularly, it relates to processes for its production by fermentation and methods for its recovery and purification. The invention embraces this cytotoxic agent in dilute solutions, as crude concentrates and as purified solids. Peliomycin is markedly toxic to many types of neoplastic tissue cells and is particularly useful to inhibit the growth of Sarcoma 180 tumor in Swiss mice. The substance also has antibiotic activity against some microorganisms making it useful in separating and classifying mixtures of microorganisms for biological research and for the removal of microorganisms from laboratory equipment.

There is provided, according to the present invention, the process for the production of an antitumor agent, designated peliomycin, which comprises cultivating a peliomycin-producing species of Streptomyces designated *Streptomyces luteogriseus*, e.g., A.T.C.C. 15072, in an aqueous carbohydrate solution containing a nitrogenous nutrient under submerged aerobic conditions until substantial activity against Sarcoma 180 is imparted to said solution and then, if desired, recovering said peliomycin from said solution. There is further included within the scope of the present invention the peliomycin so-produced.

The microorganism producing the peliomycin of the present invention was isolated from a sample of soil collected from an alfalfa field in France and is a new species of the genus Streptomyces and has been designated *Streptomyces luteogriseus*. A culture of the living organism, given the laboratory designation C-4657, has been deposited in the American Type Culture Collection, Washington, D.C., and added to its permanent collection of microorganisms as A.T.C.C. 15072.

*Streptomyces luteogriseus* nov. sp. ATCC No. 15072 has the following cultural characteristics when grown on Glucose-Yeast-Malt Agar (glucose 4.0 gm., yeast extract 4.0 gm., malt extract 10.0 gm., agar 20.0 gm., distilled water 1000 ml., pH adjusted to 7.3 prior to sterilization) at 28° C. for 14 days.

The color tones appearing hereinafter designated M and P Plate are defined by Maerz and Paul "Dictionary of Color," McGraw-Hill (1950 edition) and those designated ISCC–NBS are defined by Kelly and Judd "The ISCC–NBS Method of Designating Colors and a Dictionary of Color Names," U.S. Department of Commerce, National Bureau of Standards, Circular 553 (1955).

COLONIAL MORPHOLOGY

Isolated colonies are large, 5–10 mm. in diameter, convex to umbonate with radial furrows. Vegetative growth is colored tan, grayish tan, yellowish brown to light brown. The formation of aerial mycelium is variable. Some colonies develop a sparse covering of grayish white to light gray aerial mycelium, others form a velvety layer which is colored ATMOSPHERE (M and P Plate 12A–3) to GRAVEL (M and P Plate 13A–4); the ISCC–NBS designations for these colors are: 33. brownish pink, 79. light grayish yellowish brown, and 93. yellowish gray. The color of the colony reverse ranges from TOAST (M and P Plate 13F–8) to TANBARK (M and P Plate 14B–8); the ISCC–NBS designations for these colors are: 57. light brown and 58. moderate brown. Light brown to light yellowish brown soluble pigments are formed in the substrate.

MICROSCOPIC

Substratal Mycelium: Well developed, branched, ca. 0.8 to 1.0µ wide, no evidence of fragmentation.

Aerial Mycelium: Monopodially branched, ca. 0.8 to 1.5µ wide.

Morphology of Sporophores: Compact to extended spiral spore chains are formed on short side branches located along axial hyphae. The extended spirals are frequently twisted or gnarled. Arrangement of the branches along the axial hyphae may be single, opposite or more rarely in whorls. The formation of whorls occurs in a random fashion and is quite distinct from the regularly spaced whorls typical of the genus Streptoverticillium Baldacci.

Spores: Catenulate, smooth-walled, ovoid to elongated ovoid, ca. 0.8 to 1.0×0.9 to 1.3µ.

*Streptomyces luteogriseus*, ATCC No. 15072, exhibits the following cultural characteristics when grown in a crosshatch pattern on the indicated nutrient media for 14 days at 28° C.:

Medium No. 1 Tomato Paste-Oatmeal Agar

Vegetative: Moderate, colorless changing to grayish tan.

Aerial Mycelium: Moderate, mainly at margin of growth, MOONMIST (M and P Plate 12A–2) to ATMOSPHERE (M and P Plate 12A–3); ISCC–NBS designations: 33. brownish pink, 79. light grayish yellowish brown, and 93. yellowish gray.

Reverse: ELK (M and P Plate 16A–11) to PRAIRE (M and P Plate 13F–6); ISCC–NBS designations: 81. dark grayish yellowish brown and 76. light yellowish brown.

Soluble Pigment: Light brown to light greenish brown.

Remarks: Non-chromogenic, best sporulation at margin of growth, spiral spore chains observed.

Medium No. 2 Glucose-Yeast-Malt Agar

Vegetative: Abundant, colorless, later tan to yellowish brown.

Aerial Mycelium: Fair, mainly at margin of growth, FLESH (M and P Plate 11A–2) to GRAVEL (M and P Plate 13A–4); ISCC–NBS designations: 73. pale orange yellow, 93. yellowish gray, and 79. light grayish yellowish brown.

Reverse: TOAST (M and P Plate 13F–8) to TANBARK (M and P Plate 14B–8); ISCC–NBS designations: 57. light brown and 58. moderate brown.

Soluble Pigment: Light brown to light yellowish brown.

Remarks: Non-chromogenic, spiral spore chains observed, spores smooth-walled.

Medium No. 3 Bennett's Agar

Vegetative: Moderate, INDIA BUFF (M and P Plate 12E–5); ISCC–NBS designation: 76. light yellowish brown.

Aerial mycelium: Sparse, white to light grayish white, limited to margin of growth.

Reverse: INDIA BUFF (M and P Plate 12E–5); ISCC–NBS designation: 76. light yellowish brown.

Soluble Pigment: Light brown.

Remarks: Non-chromogenic.

Medium No. 4 Nutrient Agar

Vegetative: Fair, colorless.

Aerial Mycelium: Sparse, white, restricted to extreme margin of growth.

Reverse: INDIA BUFF (M and P Plate 12E–5); ISCC–NBS designation: 76. light yellowish brown.
Soluble Pigment: Tan to very light brown.
Remarks: Non-chromogenic.

*Medium No. 5 Tryptone-Glucose Agar*

Vegetative: Moderate, brown.
Aerial Mycelium: Sparse, white to grayish white, limited to margin of growth.
Reverse: CONGO (M and P Plate 8H–11); ISCC–NBS designation: 81. dark grayish yellowish brown.
Soluble Pigment: Brown to dark brown.
Remarks: Chromogenic.

*Medium No. 6 Starch-Ammonium Agar (inorganic salts-starch agar)*

Vegetative: Fair, colorless to pale yellow.
Aerial Mycelium: Fair, powdery, white to grayish white; occasionally becoming MOONMIST (M and P Plate 12A–2); ISCC–NBS designation: 93. yellowish gray.
Reverse: ITALIAN STRAW (M and P Plate 11D–2) to RAFFIA (M and P Plate 11E–5); ISCC–NBS designations: 89. pale yellow, 90. grayish yellow, 76. light yellowish brown.
Soluble Pigment: None.
Remarks: Positive starch hydrolysis, spiral spore chains observed.

*Medium No. 7 Glycerol-Calcium Malate Agar*

Vegetative: Moderate, colorless to pale yellow.
Aerial Mycelium: Scant, powdery white to grayish white.
Reverse: IVORY (M and P Plate 10B–2) to LEGHORN (M and P Plate 10D–3); ISCC–NBS designation: 89. pale yellow.
Soluble Pigment: None.
Remarks: Moderate clearing of the medium, 3–4 mm. zone at 14 days, spiral spore chains observed.

*Medium No. 8 Glucose-Asparagine Agar*

Vegetative: Moderate, colorless to pale yellow.
Aerial Mycelium: Very sparse, white.
Reverse: OYSTER WHITE (M and P Plate 10B–2) to STRAW (M and P Plate 10F–2); ISCC–NBS designations: 121. pale yellow green, 89. pale yellow, and 90. grayish yellow.
Soluble Pigment: None.
Remarks: Spiral spore chains observed.

*Medium No. 9 Sucrose-Nitrate Agar*

Vegetative: Very poor, colorless.
Aerial Mycelium: None.
Reverse: Colorless.
Soluble Pigment: None.

*Medium No. 10 Glucose-Nitrate Agar*

Vegetative: Very poor, colorless.
Aerial Mycelium: None.
Reverse: Colorless.
Soluble Pigment: None.

*Medium No. 11 Glycerol-Nitrate Agar*

Vegetative: Poor to fair, white.
Aerial Mycelium: None.
Reverse: OYSTER WHITE (M and P Plate 10B–2); ISCC–NBS designation: 121. pale yellow green.
Soluble Pigment: None.

*Medium No. 12 Starch-Nitrate Agar*

Vegetative: Abundant, cream to pale yellow.
Aerial Mycelium: Moderate, white, powdery.
Reverse: NANKEEN (M and P Plate 10F–3); ISCC–NBS designations: 86. light yellow, 87. moderate yellow, 89. pale yellow, 90. grayish yellow.
Soluble Pigment: None.
Remarks: Positive starch hydrolysis.

Miscellaneous physiological tests are presented in Tables I and II:

TABLE I.—PHYSIOLOGICAL CHARACTERISTICS OF *STREPTOMYCES LUTEOGRISEUS*

| Medium: | Remarks |
|---|---|
| Peptone iron agar +0.1% Yeast extract | H$_2$S positive. |
| Tryptose blood agar | Hemolysis negative, medium blackened. |
| Bennett's agar | Catalase positive. |
| Organic nitrate broth | Rapid reduction to nitrite. |
| Synthetic nitrate broth | Do. |
| Starch ammonium agar | Starch hydrolysis positive. |
| Starch nitrate agar | Do. |
| Purple milk | No coagulation of peptonization, orange brown ring, pH 5.8 after 21 days at 28° C. |
| Dietz 0.1% tyrosine agar | Growth moderate, scant white aerial mycelium, red soluble pigment. |
| Cellulose activity | No noticeable decomposition of filter paper strip in synthetic nitrate medium after 28 days at 28° C. |
| 15% gelatin | Liquefaction positive (25%), cream surface growth and ring, light brown to golden brown soluble pigment in liquefied portion, nonchromogenic after 21 days at 28° C. |
| Potato plug | Growth abundant as wrinkled vegetative, grayish white to light gray aerial mycelium, plug blackened after 21 days at 28° C. |
| Tryptone-yeast extract broth | Dark brown pigmentation of the medium after 48 hours at 28° C., chromogenic. |

TABLE II.—CARBON UTILIZATION PATTERN OF *STREPTOMYCES LUTEOGRISEUS* [1]

D-Xylose—+
L-Arabinose—+
L-Rhamnose—+
D-Fructose—+
D-Galactose—+
Glucose—+
Maltose—+
Sucrose—+
Lactose—+
Cellobiose—+
D-Raffinose—+
Soluble Starch—+
Dextrin—+
Inulin—+

Dulcitol—(—)
D-Mannitol—+
D-Sorbitol—(—)
Insoitol—+
Glycerol—+
Salicin—+
Na-acetate—(+)
Na-citrate—(+)
Na-oxalate——
Na-salicylate——
Na-tartrate——
Na-succinate—(+)
Na-malate—(+)
Control——

*Streptomyces luteogriseus* most closely resembles *Streptomyces calvus*, ATCC No. 13382, described by Backus et al., "Antibiotics and Chemotherapy," 7:532–541 (1957) and in United States Patent No. 2,914,525. A comparison

---

+=definite utilization; (+)=probable utilization; (—)=no utilization; ——=no growth.
[1] Pridham, T. G., and Gottlieb, D., Assimilation of Carbon Compounds in Synthetic Medium, J. Bacteriol. 56:107–114. 1948.

reveals that both cultures produce spiral spore chains, form yellowish gray aerial mycelium and light colored vegetative growth.

The differences that serve to distinguish *Streptomyces luteogriseus* nov. sp. from *Streptomyces calvus*, ATCC No. 13382, are presented in Table III below:

TABLE III.—COMPARISON OF *STREPTOMYCES LUTEOGRISEUS* ATCC 15072 WITH *STREPTOMYSES CALVUS* ATCC 13382

| Medium/Culture | *S. luteogriseus* nov. sp. | *S. calvus* ATCC 13382 |
| --- | --- | --- |
| H₂S production | + | − |
| Purple milk: | | |
|   Coagulation | − | +. |
|   Peptonization | − | +. |
|   Final pH | 5.8 | 7.2. |
| Nutrient agar: Soluble pigment | Tan to light brown | None. |
| Gelatin: soluble pigment | Light brown to golden brown. | Do. |
| Sucrose nitrate agar: | | |
|   Growth | Very poor | Moderate. |
|   Aerial mycelium | None | White yellowish gray. |
| Bennett's agar: | | |
|   Vegetative | Light yellowish brown | Colorless to yellowish. |
|   Soluble pigment | Light brown | None. |
| Carbon assimilation: | | |
|   Arabinose | Readily utilized | Poorly utilized. |
|   Salicin | do | Do. |
| Antibiotic produced | Peliomycin (cytotoxic for mammalian cell cultures; limited antibacterial activity). | Nucleocidin (antitrypanosomal and broad-spectrum antibacterial activity). |

*Streptomyces luteogriseus* ATCC 15072, when grown under suitable conditions, produces peliomycin. A fermentation broth containing peliomycin is prepared by inoculating spores or mycella of the peliomycin-producing organism into a suitable medium and then cultivating under aerobic conditions. For the production of peliomycin, cultivation on a solid medium is possible, but for production in large quantity, cultivation in a liquid medium is preferable. The temperature of the cultivation may be varied over a wide range, 20°–35° C., within which the organism may grow, but a temperature of 25°–30° C. and a neutral pH, i.e., 6.0–8.0, are preferred. In the submerged aerobic fermentation of the organism for the production of peliomycin, the medium contains as the source of carbon a commercially available glyceride oil or a carbohydrate such as glycerol, glucose, maltose, sucrose, lactose, dextrin, starch, etc. in pure or crude states and as the source of nitrogen, an organic material such as soybean meal, distillers solubles, peanut meal, cottonseed meal, meat extract, peptone, fish meal, yeast extract, corn steep liquor, etc., and when desired, inorganic sources of nitrogen such as nitrates and ammonium salts, and mineral salts such as sodium chloride, potassium chloride and magnesium sulfate, and buffering agents such as calcium carbonate or phosphates and trace amounts of heavy metal salts; such medium ingredients include those listed in Canadian Patent 513,324 and in British Patents 730,341 and 736,325 and in United States Patents 2,691,618, 2,658,018, 2,653,899, 2,586,762, 2,516,080, 2,483,892, 2,609,329 and 2,709,672. In aerated submerged culture, an antifoam such as liquid paraffin, fatty oils or silicone is used. More than one kind of carbon source, nitrogen source or antifoam may be used for the production of peliomycin. Generally, the cultivation is continued until at least several hundred mcg./ml. of peliomycin is accumulated in the medium. The active substance is contained mainly in mycelia.

The mycelia is separated from the fermentation liquor, washed with water, and then extracted by water-soluble solvents such as acetone, methanol, ethanol, and other low alcohols or by water-immiscible solvents such as ether, chloroform, and the like. The solvent-extract is concentrated and the active substance extracted by water-insoluble solvents such as hydrocarbon solvent (boiling point 63°–75° C.), ethyl acetate, and the like from the water-containing concentrate. The crude peliomycin is purified by liquid-liquid extraction methods, e.g., Craig's countercurrent distribution technique, and pure peliomycin is isolated as a crystalline solid.

Peliomycin is a stable, colorless crystalline substance having the form of hexagonal plates and melts at 160°–164° C. (hot stage, uncorrected). It is very soluble in most organic solvents, e.g. ether, ethyl acetate, slightly soluble in ligroin and insoluble in water, nitromethane, aqueous mineral acid and sodium hydroxide.

The specific rotation of peliomycin is $[\alpha]_D^{25} = -74.2°$ (c.=1, chloroform). The ultraviolet spectrum of a chloroform solution shows a shoulder at 295 m$\mu$ and end absorption, while a solution in concentrated sulfuric acid gives a maximum at 280 m$\mu$ with an absorptivity of 25.

The elemental analysis of the product is as follows: C=64.7%, H=8.9%, O=26.4% (by difference) and C-methyl=14.91%. No other elements are present. The molecular weight by thermoelectirc determination is 858 and the analysis and molecular weight indicate that the molecular formula is $C_{46}H_{76}O_{14}$.

The infrared absorption spectrum of peliomycin pelleted in potassium bromide, as shown in the attached drawing, exhibits absorption maxima at the following wave lengths in microns: 2.85, 3.4, 5.9, 6.1, 6.8, 7.2, 7.8, 9.1, and 10.1. The infrared spectrum is consistent with the presence of hydroxyl and carbonyl groups.

Peliomycin gives a positive ferric hydroxamate test (Feigel, Spot Tests, 1954) for esters. A yellow color is obtained when it is dissolved in concentrated sulfuric acid, and a solution in acetic anhydride turns red on addition of a drop of concentrated sulfuric acid. Solutions in carbon tetrachloride decolorize bromine, while solutions in acetone decolorize potassium permanganate.

It is stable in aqueous alcohol for 2 hours at room temperature over a pH range of 1.3 to 9.2. Biological activity is considerably reduced at a pH of 10.2. Peliomycin is hydrolyzed at reflux temperature by alcoholic potassium hydroxide or alcoholic hydrochloric acid. The acetate of peliomycin is prepared by dissolving 100 mg. in pyridine (5 ml.) and acetic anhydride (5 ml.). The solution is allowed to stand overnight, diluted with water, and then evaporated to dryness. The residue is crystallized from ligroin and yields 56 mg. of an acetate which melts at 130°–134° C. (hot stage, uncorrected), has the following elemental analysis: C=63.5; H=7.88; O=28.62 (by difference); acetyl=19.26; and C-methyl=20.72; and has the molecular formula $C_{56}H_{86}O_{19}$.

Peliomycin has been found to have antitumor activity against Sarcoma 180. The daily injection of 0.8 mg./kg./day of peliomycin inhibited Sarcoma 180 tumor in Swiss mice, and was fairly well tolerated by the mice as evidenced by the lack of appreciable weight loss and mortality. The test data are summarized in the table.

TABLE IV.—EFFECT OF PELIOMYCIN ON TRANSPLANTED SARCOMA 180 MOUSE TUMOR

| Dose, [1] mg./kg./day | Av. Wt. Diff. [2] (T−C), gm. | T/C [3] (av. diam. in cm.) | Survivors at 8th Day |
| --- | --- | --- | --- |
| 0.8 | −0.7 | 0.60 | 17/20 |
| 0.4 | 0.0 | 0.81 | 18/20 |
| 0.2 | −0.4 | 0.79 | 20/20 |
| 0.1 | +0.9 | 0.89 | 15/15 |
| 0.05 | -------- | -------- | -------- |

[1] Treatment started 24 hours after inoculation of the tumor cells.
[2] Av. Wt. Diff. (T−C)=Average Weight Difference of Treated Control.
[3] T/C (Av. Diam. in cm.)=Treated/Control Average Tumor Diameter in centimeters.

Peliomycin is also markedly toxic in vitro to the following types of neoplastic tissue cells: HeLa, human epidermoid carcinoma of cervix; KB, human epidermoid carcinoma of nasopharynx; Sarcoma 180; Ehrlich ascites carcinoma; and L, mouse fibroblast, but has a relatively low toxicity, i.e., $LD_{50}$ of the intraperitoneally-administered agent for Swiss mice is 9.2 mg./kg. The following table represents the cell culture toxicity data:

TABLE V.—CELL CULTURE TOXICITY OF PELIOMYCIN

| Types of tissue cells: | 50% inhibition dose ($\mu$g./ml.) |
|---|---|
| KB | .003 |
| EA | .004 |
| HeLa | .003 |
| S-180 | .004 |
| L | .007 |

Peliomycin exhibits in vitro antimicrobial activity against some microorganisms including the following:

| Organism: | Minimum inhibitory concentration ($\mu$g./ml.) |
|---|---|
| Anaerobic bacteria.—*Peptococcus prevotii* ATCC 9321 | 100 |
| Aerobic and Facultative bacteria: | |
| *Bacillus cereus* ATCC 9634 | 100 |
| *Bacillus subtilis* ATCC 6633 | 100 |
| *Staphylococcus aureus* ATCC 6538 | 100 |
| *Staphylococcus aureus* (Smith) | 100 |
| *Diplococcus pneumoniae* | 50 |
| *Micrococcus lysodeikticus* | 1.6 |
| *Sarcina lutea* 9431 | 100 |
| *Neisseria* sp. | 100 |
| Yeasts: | |
| *Candida albicans* | 100 |
| *Saccharomyces cerevisiae* | 100 |
| *Kloekera brevis* ATCC 9774 | 6.3 |
| Protozoa: | |
| *Tetrahymena pyriformis* | 50 |
| *Ochromonas malhamensis* | 1.6 |
| *Crithidia fasciculata* | 50 |

The following example will serve to illustrate the present invention without limiting it thereto.

*Example*

*Streptomyces luteogriseus* A.T.C.C. 15072, is cultivated for 48 hours at 28° C. in shaken flasks in an aqueous medium containing 2.0% glucose, 1.0% cottonseed endosperm flour (Pharmamedia, Trader Oil Mill Company, Fort Worth, Tex.), 1.0% (by volume) corn steep liquor, 0.40% calcium carbonate, 0.30% ammonium sulfate, and 0.003% zinc sulfate.

Four percent inoculum is used to seed an aqueous production medium containing 1.0% glucose, 1.0% starch (Staclipse J. A. E. Staley Manufacturing, Decatur, Ill.), 1.0% (by volume) corn steep liquor, 0.25% ammonium sulfate, 0.25% sodium chloride, and 0.50% calcium carbonate. The fermentation is carried out on rotary shakers in 500 ml. Erlenmeyer flasks (20) containing 100 ml. of medium for 6 days at 28° C. The mycelium is separated by filtration using diatomaceous filter aid and the filtrate discarded. The wet filter cake is extracted with methanol (540 liters); the alcohol is removed by distillation, and the residual aqueous solution (68 liters) extracted with 20 liters of a hydrocarbon solvent (boiling point 63°–75° C.) and then with ethyl acetate (19 liters). The hydrocarbon extract is concentrated to a small volume and the waxy solid that is obtained is extracted with hot ether. After cooling, crude crystalline peliomycin weighing 4.5 gm. is recovered.

The ethyl acetate extract is purified by Craig's technique of counter-current distribution using the solvent system, 2 parts (by volume) chloroform, 2 parts carbon tetrachloride, 3 parts methanol and 1 part water. After 100 transfers, the peak of concentration is found in tube 27, and crystalline peliomycin (5 gm.) is obtained from tubes 24 to 30.

The crystalline materials obtained from the hydrocarbon and ethyl acetate extracts are further purified by Craig's technique of counter-current distribution using the solvent system, 2 parts (by volume) Skellysolve B (Skelly Oil Company, Kansas City, Mo.), 3 parts benzene, and 5 parts 80% ethanol. After 100 transfers, the peak of concentration is found in tube 37 by bioassay curve, the ultraviolet assay curve, and by weight curve; these curves agreed with the theoretical curve. The peliomycin obtained is then recrystallized from ether-ligroin and from 50% ethanol-water. The recrystallized peliomycin has a melting point of 160°–164° C. (hot stage, uncorrected).

We claim:
1. A composition of matter designated as peliomycin, said composition being characterized by ready solubility in ether and ethyl acetate, slight solubility in ligroin and substantial insolubility in water, nitromethane, aqueous mineral acid and sodium hydroxide and exhibiting in the pure state colorless hexagonal plates, a melting point of 160°–164° C, a molecular weight of 858 by thermoelectric determination, an elemental analysis as follows:
64.7% carbon, 8.9% hydrogen, and 26.4% oxygen (by difference), an optical rotation of $[\alpha]_D^{25} = -74.2°$ (c.=1 in chloroform), an ultraviolet absorption spectrum in chloroform exhibiting a shoulder at 295 m$\mu$ and end absorption, an ultraviolet spectrum in concentrated sulfuric acid giving a maximum at 280 m$\mu$ with an absorptivity of 25, and an infrared absorption spectrum in potassium bromide as shown in the drawing.

2. The process of producing a new, biologically active substance, identified as peliomycin, which comprises cultivating a peliomycin-producing strain of *Streptomyces luteogriseus* under submerged aerobic conditions in an aqueous carbohydrate solution containing a nitrogenous nutrient until substantial activity versus Sarcoma 180 in mice is produced in said medium.

3. The process of producing a new, biologically active substance, identified as peliomycin, which comprises cultivating a peliomycin-producing strain of *Streptomyces luteogriseus* under submerged aerobic conditions in an aqueous carbohydrate solution containing a nitrogenous nutrient until substantial activity versus Sarcoma 180 in mice is produced in said medium and then recovering from the broth the peliomycin thus produced.

4. The process of producing a new, biologically active substance, identified as peliomycin, which comprises cultivating a peliomycin-producing strain of *Streptomyces luteogriseus* under submerged aerobic conditions in an aqueous carbohydrate solution containing a nitrogenous nutrient at a temperature of substantially from 22°–32° C. and for about one to six days.

5. The process of claim 2 wherein said peliomycin-producing strain is *Streptomyces luteogriseus* A.T.C.C. 15072.

No references cited.

ALBERT T. MEYERS, *Primary Examiner.*

SAM ROSEN, *Examiner.*